US006815511B2

(12) United States Patent
Verser et al.

(10) Patent No.: US 6,815,511 B2
(45) Date of Patent: Nov. 9, 2004

(54) CONTINUOUS WITHDRAWAL FROM HIGH SOLIDS SLURRY POLYMERIZATION

(75) Inventors: Donald W. Verser, Houston, TX (US); David H. Burns, Houston, TX (US); James E. Hein, Houston, TX (US); George K. Rajaendran, Humble, TX (US); John D. Hottovy, Barlesville, OK (US)

(73) Assignee: Chevron Phillips Chemical Company, LP, The Woodlands, TX (US)

( * ) Notice: Subject to any disclaimer, the term of this patent is extended or adjusted under 35 U.S.C. 154(b) by 0 days.

(21) Appl. No.: 10/668,857

(22) Filed: Sep. 23, 2003

(65) Prior Publication Data

US 2004/0122187 A1 Jun. 24, 2004

Related U.S. Application Data

(60) Continuation-in-part of application No. 10/176,289, filed on Jun. 20, 2002, which is a continuation of application No. 09/586,370, filed on Jun. 2, 2000, which is a division of application No. 08/893,200, filed on Jul. 15, 1997, now Pat. No. 6,239,235.
(60) Provisional application No. 60/413,924, filed on Sep. 25, 2002.

(51) Int. Cl.[7] ................................................. C08F 2/14
(52) U.S. Cl. ........................... 526/64; 526/104; 526/348
(58) Field of Search ............................ 526/64, 104, 348

(56) References Cited

U.S. PATENT DOCUMENTS

| 5,183,866 | A | 2/1993 | Hottovy | 526/88 |
|---|---|---|---|---|
| 5,387,659 | A | 2/1995 | Hottovy | 526/59 |
| 5,455,314 | A | 10/1995 | Burns et al. | 526/61 |
| 5,565,174 | A | 10/1996 | Burns et al. | 422/131 |
| 5,565,175 | A | 10/1996 | Hottovy et al. | 422/132 |
| 6,042,790 | A | 3/2000 | Hottovy et al. | 422/131 |
| 6,045,661 | A | 4/2000 | Kreischer et al. | 203/73 |
| 6,114,501 | A | 9/2000 | Hottovy et al. | 528/501 |
| 6,204,344 | B1 * | 3/2001 | Kendrick et al. | 526/64 |
| 6,239,235 | B1 | 5/2001 | Hottovy et al. | 526/64 |
| 6,566,460 | B1 * | 5/2003 | Salmon | 526/64 |
| 2003/0229187 | A1 | 12/2003 | Kufeld et al. | 526/64 |

* cited by examiner

*Primary Examiner*—Caixia Lu
(74) *Attorney, Agent, or Firm*—Fletcher Yoder (57) ABSTRACT

An improved polymerization process includes withdrawing a portion of a fluid slurry through a plurality of active continuous take off mechanisms, monitoring the pressure of feed material fed to the reactor, and adjusting the continuous take off mechanisms in response to the monitored feed line pressure.

13 Claims, 7 Drawing Sheets

$0 < \alpha \leq 90°$

CONTINUOUS WITHDRAWAL FROM HIGH SOLIDS SLURRY POLYMERIZATION

RELATED APPLICATIONS

This application claims priority benefits from U.S. Provisional Application No. 60/413,924, filed Sep. 25, 2002. This application is a continuation-in-part of U.S. Ser. No. 10/176,289 filed Jun. 20, 2002, which is a continuation of U.S. Ser. No. 09/586,370 filed Jun. 2, 2000, which is a divisional of U.S. Ser. No. 08/893,200 filed Jul. 15, 1997, now U.S. Pat. No. 6,239,235. The specification and claims of each patent and patent application identified in this paragraph are hereby incorporated by reference.

FIELD OF THE INVENTION

The present invention relates to the slurry polymerization of olefin monomers. More particularly, the present invention relates to improved techniques for continuously withdrawing a portion of the fluid slurry from a loop reaction zone and operating a loop reactor having a plurality of continuous take off.

BACKGROUND OF THE INVENTION

Polyolefins such as polyethylene and polypropylene may be prepared by particle form polymerization, also referred to as slurry polymerization. In this technique, feed materials such as diluent, monomer and catalyst are introduced to a loop reaction zone, and a fluid slurry containing solid polyolefin particles in a liquid medium (usually an inert diluent and/or unreacted monomer) is circulated through the loop reaction zone. A portion of the fluid slurry is withdrawn from or taken off the reaction zone so that the solid polyolefin particles can be recovered.

In continuous loop reactors, the various feed materials may be introduced to the loop reaction zone in various ways. For example, the monomer and catalyst may be mixed with varying amounts of diluent prior to introduction to the loop reaction zone. The monomer may also be combined with recycled diluent and then fed to the loop reaction zone. In the loop reaction zone, the monomer and catalyst become dispersed in the fluid slurry. As the fluid slurry circulates through the loop reaction zone, the monomer reacts at the catalyst in a polymerization reaction. The polymerization reaction yields solid polyolefin particles in the fluid slurry.

Slurry polymerization in a loop reaction zone has proven commercially successful. The slurry polymerization technique has enjoyed international success with billions of pounds of olefin polymers being so produced annually. With this success has come the desirability, in some situations, of building larger reactors. Larger reactors lead to higher flow rates of fluid slurry. The flow rate inside a loop reactor can be as high as 1,000,000 gallons (3,785,410 liters) per minute or more.

In a continuous take off process, the withdrawn slurry is usually a small portion of the fluid slurry that is in a loop reaction zone. The flow of this smaller withdrawn slurry typically ranges from 50 gallons (189 liters) per minute to 3000 gallons (11,356 liters) per minute. The large flow in the reactor can transport polymer in the form of slurry particles that are small, but also transport larger polymer particles or fused chunks of polymer. The larger polymer chunks or particles, some with diameters larger than the opening of the take off valve, may plug the take off valve. When such larger particles attempt to pass through the take off valve, either the particle breaks or the take off valve is restricted in flow.

Flow restriction causes loss of flow through the take off valve and may cause more polymer particles to build up. This may cause the reactor pressure to increase, since it is usually controlled (at least partially) by how much the take off valve is opened. If the build up in polymer particles is quicker than the action of the control mechanism for controlling pressure by opening the take off valve, a plugged line and excessive reactor pressures may result. This may be especially severe for fused or atypical polymer chunks that can grow in the loop reactor and have a much larger dimension than the largest polymer particle size. Plugged reactor take off valves can lead to reactor over pressure, downtime, production loss, and in extreme situations, relief of reactor pressure by process safety relief valves.

A ram valve may be used to close off a continuous take off mechanism that is not being used. The ram valve has the advantage of preventing polymer accumulation in the slurry withdrawal line. However, if one desires to begin using that continuous take off mechanism, it takes some time (for example, 10 to 20 minutes) to make it ready for operation, and the ram valve must be manually opened.

SUMMARY OF THE INVENTION

As one aspect, a polymerization process is provided. The process includes feeding a feed material comprising at least one olefin monomer to a loop reaction zone and polymerizing the olefin monomer to produce a fluid slurry comprising solid olefin polymer particles. The process also includes continuously withdrawing a portion of the fluid slurry through a plurality of active continuous take off, and passing the withdrawn slurry portion through a take off valve. The process may also include monitoring the pressure of the feed material and adjusting the take off valve in response to the monitored feed material pressure. The process may also include flushing diluent through least one inactive continuous take off. The inactive continuous take off may be activated when one of the active continuous take off is at least partially plugged. The process may also include sensing when the take off valve is closed and automatically flushing a slurry withdrawal line associated with the take off valve with diluent when the take off valve is closed.

As another aspect, a loop reactor apparatus is provided. The loop reactor apparatus includes a plurality of major segments and a plurality of minor segments. Each of the major segments is connected at a first end to one of the minor segments, and is connected at a second end to another minor segment. As a result, the major segments and the minor segments form a continuous flow path adapted to convey a fluid slurry. The continuous flow path is substantially free from internal obstructions. The loop reactor also includes a means for introducing an olefin monomer and/or a liquid medium (for example, an inert diluent) into the continuous flow path, a means for introducing a polymerization catalyst into the continuous flow path, and at least two means for continuously taking off a portion of the fluid slurry from the continuous flow path. Alternatively, the loop reactor includes at least four means for continuously taking off a portion of the fluid slurry. Such a loop reactor may have a volume greater than 30,000 gallons, alternatively greater than 35,000 gallons, alternatively greater than 40,000 gallons, alternatively greater than 45,000 gallons, alternatively greater than 50,000 gallons, alternatively greater than 75,000 gallons, alternatively greater than 100,000 gallons.

As yet another aspect, a loop reactor apparatus is provided. The loop reactor apparatus comprises a plurality of major legs and a plurality of minor segments. Each minor segment connects two of the major legs to each other, and by these connections, the legs and the segments comprise a continuous flow path. A monomer feed is attached to one of the legs or segments. At least one catalyst feed is attached to one of the legs or segments. A continuous take off is attached to one of the legs or segments. The continuous take off includes a slurry withdrawal line in fluid communication with the reactor, a take off valve disposed along the slurry withdrawal line for regulating flow of the slurry through the slurry withdrawal line, and a flush line fluidly connected to provide diluent to the slurry withdrawal line.

In the foregoing loop reactor apparatus, at least two of the minor segments form continual curves. At least two of the continual curves have one or more continuous take off mechanisms or means attached to them. The loop reactor apparatus may be essentially free of horizontal flow paths in that all the major legs are connected by continual curves.

The apparatus may also include at least one spare continuous take off mechanism or means for continuously withdrawing product slurry. Preferably, the continuous take off mechanism or means comprises a V-ball valve having a nominal body size of at least 1½ inch. The continuous take off valve may be automatically controlled by a controller, which adjusts the continuous take off valve in response to one or more input signals from pressure transmitters on the monomer feed to the loop reactor (or other means for introducing the olefin monomer to the loop reactor). Additionally or alternatively, a pressure transmitter may be disposed on the slurry withdrawal line downstream of the continuous take off valve. The pressure transmitter may be operatively connected to provide a signal to the controller. One or all of the continuous take off mechanisms or means may be automatically controlled in such fashions.

The continuous take off mechanisms or means may be the exclusive means for withdrawing the portion of slurry; that is, the present process and apparatus allow the elimination of settling legs from the reactor altogether.

As yet another aspect, a continuous take off mechanism for a loop polymerization reactor is provided. The mechanism comprises a slurry withdrawal line in fluid communication with the reactor, a take off valve disposed along the slurry withdrawal line for regulating flow of the slurry through the slurry withdrawal line, a flush line fluidly connected to provide diluent to the slurry withdrawal line, and a controller. The controller is configured to receive an input signal from pressure transmitters disposed on a monomer feed and on the slurry withdrawal line downstream of the take off valve. The controller is also configured to send an output signal to adjust the take off valve.

As yet another aspect, a process for starting a loop polymerization reactor is provided. The process comprises feeding ethylene to the reactor and feeding isobutane to the reactor. The mass ratio of ethylene to isobutane fed to the reactor is sufficiently low to avoid plugging of the continuous take off mechanism.

As still another aspect, a process for operating a loop polymerization reactor is provided. The process includes feeding ethylene to the reactor, feeding isobutane to the reactor, feeding a polymerization catalyst to the reactor, circulating a fluid slurry comprising unreacted ethylene and solid polyethylene particles in the isobutane through the reactor, continuously withdrawing a portion of the fluid slurry through a plurality of continuous take off mechanisms, and continuously flushing isobutane through the slurry withdrawal line of an inactive continuous take off mechanism. In this manner, a "hot spare" or "hot standby" is provided for the reactor.

DETAILED DESCRIPTION OF THE INVENTION

The present process and apparatus relate to continuous take off or withdrawal of a portion of the fluid slurry in a loop reactor. This facilitates operation of the loop reactor at a much higher solids concentration. In particular, the present process and apparatus relate especially to large loop reactors having continuous take off instead of settling legs. The present techniques facilitate reliable operation of such large reactors and reliable withdrawal of product.

The present process and apparatus are applicable to any olefin polymerization in a loop reactor that produces a slurry of solid polyolefin particles in a liquid medium. Suitable olefin monomers are 1-olefins having up to 8 carbon atoms per molecule and no branching nearer the double bond than the 4-position. The present process and apparatus are particularly suitable for the homo polymerization of ethylene and the copolymerization of ethylene and a higher 1-olefin such as butene, 1-pentene, 1-hexene, 1-octene or 1-decene. Especially preferred is ethylene and 0.1 to 10 weight percent, preferably 0.01 to 5 weight percent, most preferably 0.1 to 4 weight percent higher olefin based on the total weight of ethylene and comonomer. Alternatively sufficient comonomer can be used to give the above-described amounts of comonomer incorporation in the polymer. Such polymers are still referred to as polyethylene herein.

Suitable diluents (as opposed to solvents or monomers) are well known in the art and include hydrocarbons which are inert and liquid under reaction conditions. Suitable hydrocarbons include isobutane, propane, n-pentane, i-pentane, neopentane and n-hexane, with isobutane being especially preferred.

Additionally, the present techniques may be employed where the monomer is the liquid medium for the olefin polymerization. For example, the present techniques may be used for the polymerization of propylene where propylene is the liquid medium, and an inert diluent is not present in any substantial amount. A diluent may still be used for the catalyst. For illustration, but not as a limitation, the present invention will be described in connection with a polyethylene process using an inert diluent as the liquid medium, but it is to be understood that the present invention may also be employed where the monomer is used as the liquid medium and would take the place of the diluent in the following descriptions.

Suitable catalysts are well known in the art. Particularly suitable is chromium oxide on a support such as silica as broadly disclosed, for instance, in U.S. Pat. No. 2,825,721, which is incorporated by reference herein. Ziegler catalysts, metallocenes, and other well-known polyolefin catalysts, as well as co-catalysts, may be used.

Additional details regarding loop reactor apparatus and polymerization processes may be found in U.S. Pat. Nos. 4,674,290; 5,183,866; 5,565,174; 5,624,877; 6,005,061; 6,045,661; 6,051,631; 6,114,501; and 6,420,497, which are also incorporated by reference herein.

Figure 1A:
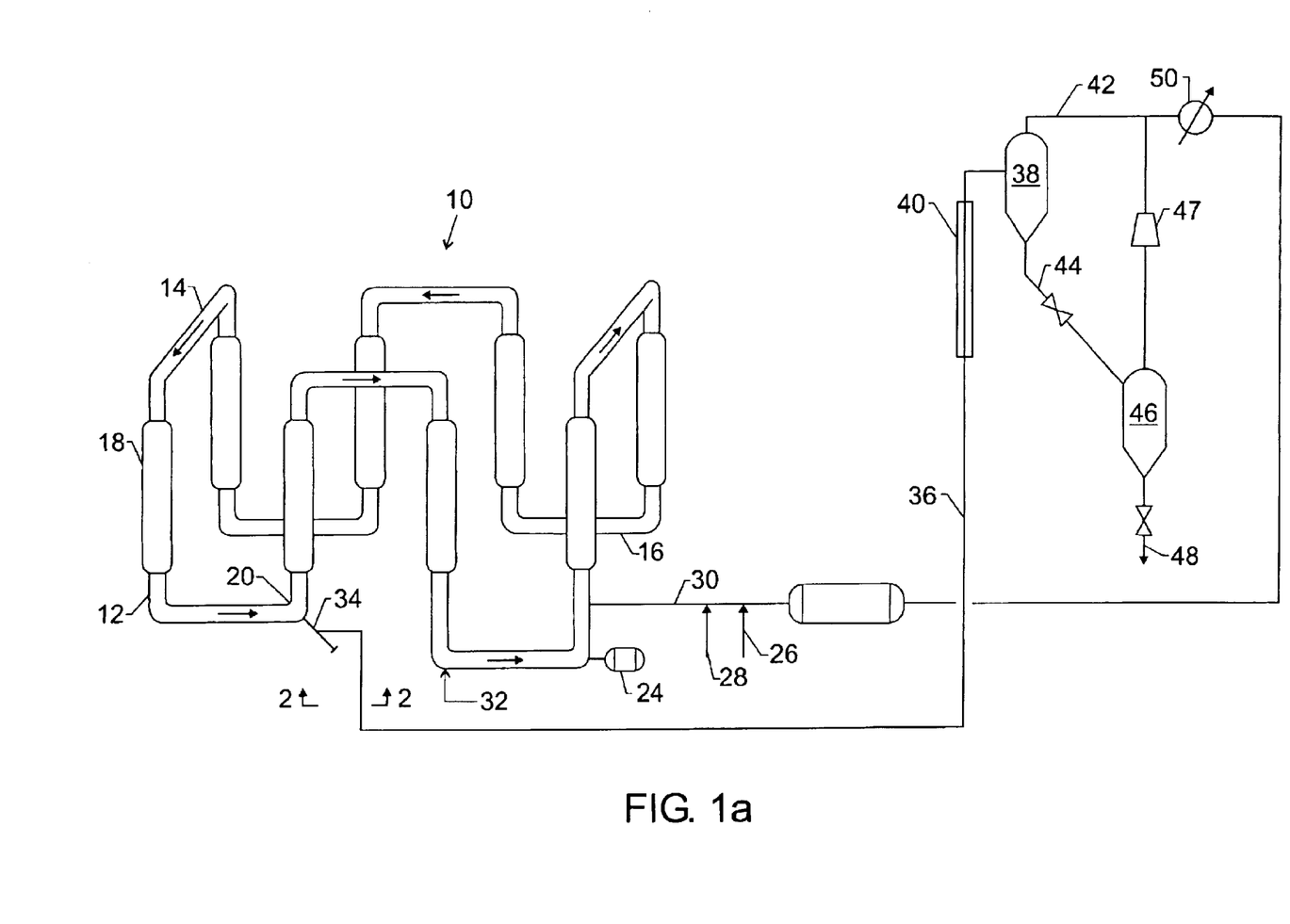
FIGS. 1(a) and (b) show loop reactors and polymer recovery systems.
Figure 1B:
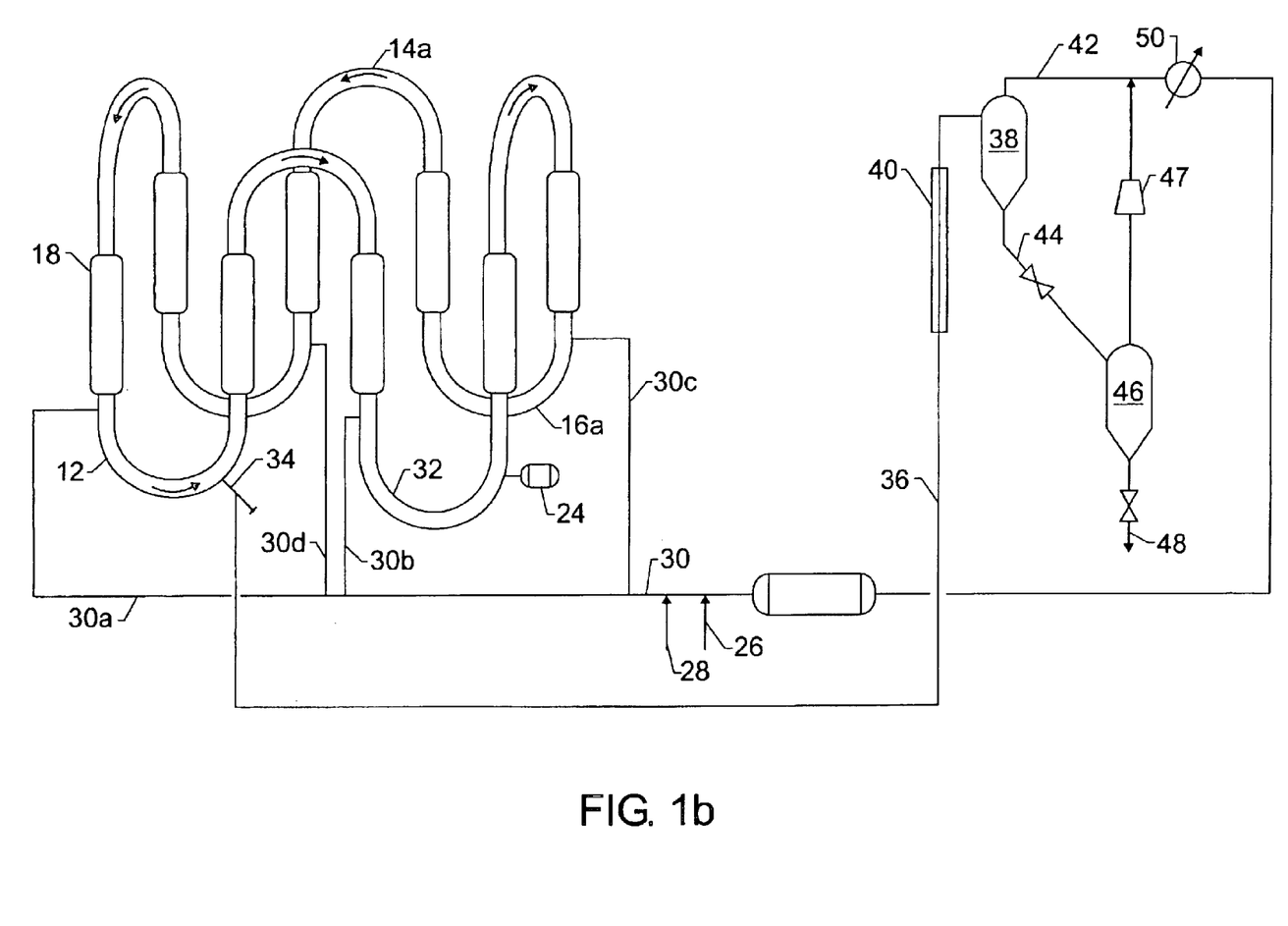

Referring now to the drawings, FIG. 1(a) shows a loop reactor 10 having eight vertical segments 12, upper horizontal segments 14 and lower horizontal segments 16. The horizontal segments may be replaced by curved segments or continual curves so that the reactor contains essentially no horizontal flow paths, as shown in FIG. 1(b). In FIG. 1(a), these upper and lower horizontal segments define upper and lower zones of horizontal flow. In FIG. 1(b), the upper and lower curved segments 14a and 16a take the places of the horizontal segments. The reactor is cooled by means of heat exchangers formed by pipe 12 and jacket 18. Each segment is connected to the next segment by a smooth bend or elbow 20 thus providing a continuous flow path substantially free from internal obstructions. The fluid slurry is circulated by means of an impeller driven by motor 24. Monomer (and comonomer, if any) and fresh diluent are introduced through lines 26 and 28 respectively which can enter the reactor directly at one (as shown in FIG. 1(a)) or a plurality (as shown in FIG. 1(b)) of locations or can combine with recycled diluent line 30 as shown. In FIG. 1(b) the recycle diluent line splits to provide four feed points 30a, 30b, 30c, and 30d. During initial start-up of a loop reactor having one or more continuous take off mechanisms, it has been found desirable to increase the amount of recycled diluent fed to the reactor, with respect to the ethylene fed to the reactor. For example, a 1:1 mass flow ratio of ethylene and recycled isobutane during initial start-up has been found to reduce plugging of the continuous take off mechanism. Smaller mass flow ratios, for example, 4:5 or 2:3, may also be used. Catalyst is introduced via catalyst introduction means 32 which provides a zone (location) for catalyst introduction.

A continuous take off mechanism for withdrawing an intermediate product slurry is designated broadly by reference character 34. Continuous take off mechanism 34 is located in or adjacent to an end, preferably a downstream end, of one of the lower horizontal segments 16 or the lower curved segments 16a or adjacent or on a connecting elbow 20. One advantage of the continuous take off mechanism 34 is that it can eliminate the need for horizontal segments. Settling legs typically were attached to horizontal segments. Using continuous take off mechanisms facilitates the use of preferable curved segments. The continuous take off mechanism 34 is shown at the downstream end of a lower horizontal segment of the loop reactor. The location can be in an area near the last point in the loop where flow turns upward before the catalyst introduction point so as to allow fresh catalyst the maximum possible time in the reactor before it first passes a take off point. It is presently preferred to locate a continuous take off at an upward flowing elbow (an elbow in which the fluid slurry turns upward to flow up a vertical segment). However, the continuous take off mechanism can be attached to any segment, elbow or curve.

As described in U.S. Pat. No. 6,239,235, polymerization processes utilizing continuous take off instead of a traditional settling leg for slurry take off are favored for larger reactors. U.S. Pat. No. 6,239,235 (which is incorporated herein by reference) discloses an olefin polymerization process wherein monomer, diluent and catalyst are circulated in a continuous loop reactor and slurry is withdrawn by use of a continuous take off mechanism. The process may be employed in loop reaction zones of greater than 30,000 gallons. Also, reactor polymer solids concentrations of greater than 40 weight percent, and preferably greater than 50 weight percent are discussed.

The segment of the reactor to which the continuous take off mechanism is attached can be of larger diameter to slow down the flow and hence further allow stratification of the flow so that the slurry being taken off can have an even greater concentration of solids.

Figure 7:
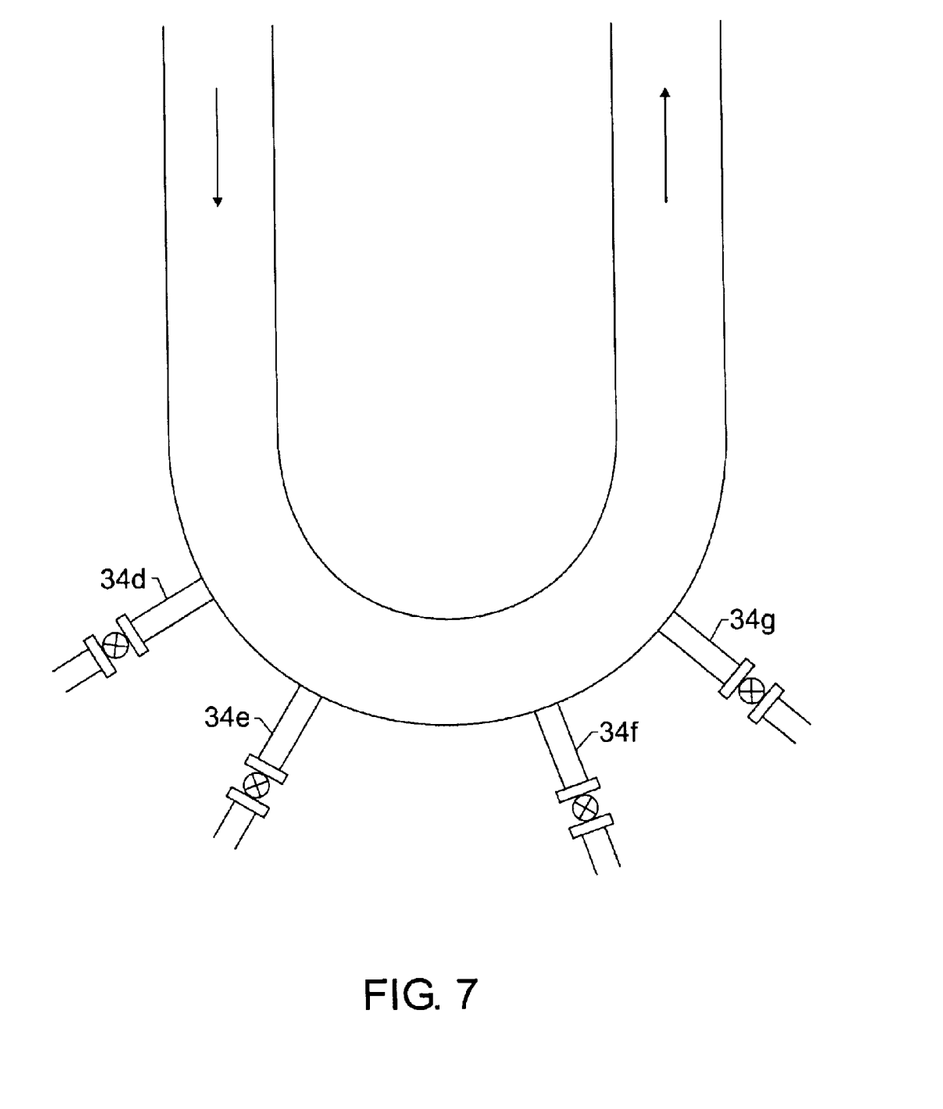
FIG. 7 is a side view of an elbow of the loop reactor showing the placement of a plurality of continuous take off mechanisms.

The withdrawn portion of the fluid slurry (the intermediate product slurry) is passed via conduit 36 to downstream separation equipment, for example a high pressure flash chamber 38 (also referred to as a flash gas separator). Conduit 36 includes a surrounding conduit 40 which is provided with a heated fluid which provides indirect heating to the slurry material in flash line conduit 36. Conduit 36 preferably has bends that turn in a wide fashion. For example, it is desirable that the radius of the inner wall of any bend (if viewed as part of a circle) be at least 3 feet alternatively at least 4 feet, alternatively at least 5 feet. FIG. 7 shows an imaginary circle and its radius as defined by a curved segment. Further, conduit 36 may be stepped up in size to allow vaporization to occur without restriction of rates. Conduit 36 may be surrounded by several sections of surrounding conduit 40 to provide greater control over the flash line heating. For example, a flash line heater may have 20 or more sections of surrounding conduit, with common or individual temperature control. The surrounding conduit 40 should be provided with low pressure steam to avoid melting the solid polymer particles traveling through flash line conduit 36.

In some systems utilizing a flash line heater, some or all of the diluent will flash in flash line 36 prior to introduction to the flash chamber 28. However, the terms "flash chamber" and "flash tank" still are frequently used for the tank that follows the flash line, where vaporized diluent separates from polymer solids. "Flash tank" or "flash chamber" is still used even though there may little or no flashing in the flash tank if all or substantially all of the diluent is vaporized in the flash line. In current designs which have the flash lines discharging at higher pressures and without downstream drying devices, it is intended to design the flash lines so there is little to no pressure drop on entering the flash tank with essentially all of the liquids vaporized prior to entering the vessel.

Vaporized diluent exits the high pressure flash chamber 38 through conduit 42 for further processing which includes condensation by simple heat exchange using recycle condenser 50, and return to the loop reactor, without the necessity for compression, via recycle diluent line 30. Recycle condenser 50 can utilize any suitable heat exchange fluid known in the art under any conditions known in the art. However preferably a fluid at a temperature that can be economically provided is used. A desirable temperature range for this fluid is 40 degrees F. to 130 degrees F. Polymer particles are withdrawn from high pressure flash chamber 38 via line 44 for further processing using techniques known in the art. The polymer particles may be passed to low pressure flash chamber 46 (or directly to a purge zone) and thereafter recovered as polymer product via line 48. Separated diluent passes through compressor 47 to line 42. This high pressure flash design is broadly disclosed in U.S. Pat. No. 4,424,341, which is hereby incorporated by reference.

Continuous take off not only allows for higher solids concentration upstream in the reactor, but also allows better operation of the high pressure flash, thus allowing the majority of the withdrawn diluent to be flashed off and recycled with no compression. Indeed, 70 to 90 percent or more of the diluent can generally be recovered in this manner. Preferably 90 to 95 percent or more of the diluent is recovered in this fashion. Because the flow of product slurry is continuous instead of intermittent, the flash line heaters work better. Also the flash lines may be designed with an appropriate amount of pressure drop to get high velocities and high heat transfer coefficients and to limit maximum flow. In such designs, the CTO outlet pressure will be higher than it might be otherwise. The pressure drop after the continuous take off valve (which regulates the rate of continuous flow out of the reactor) is not as drastic as the pressure drop after the firing valve of a settling leg. With settling legs, the slurry temperature in the flash line is higher, and less heat is transferred into the slurry, making the flash line heater less efficient.

Figure 2:
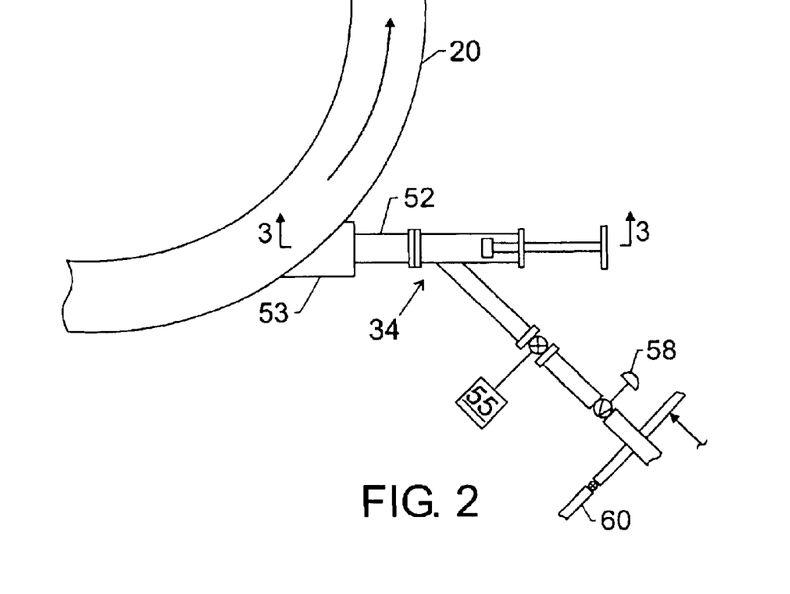
FIG. 2 is cross section along line 2—2 of FIG. 1(a) showing a continuous take off mechanism.

FIG. 2 shows a curved segment 16a with continuous take off mechanism 34 in more detail. The continuous take off mechanism typically at least includes a slurry withdrawal line in fluid communication with the reactor and a valve for controlling the flow of slurry through that line. The continuous take off mechanism shown in FIG. 2 comprises a take off cylinder 52 attached to the reactor with a flange 53, a slurry withdrawal line 54, an emergency shut off valve 55 (or block valve), a proportional motor valve 58 (the CTO valve) to regulate flow and a flush line 60. The cylinder 52 need not extend into the reactor; indeed, extending a protrusion into a loop slurry reactor may result in polymer build-up around the protrusion. However, in some circumstances the cylinder may extend into the reactor. Diluent input is generally held constant, the proportional motor valve 58 being used to control the rate of continuous withdrawal to maintain the total reactor pressure within designated set points. A manual flash line may also be connected with the flash line downstream of the proportioned motor valve 58. Diluent input may be adjusted based upon logic which calculates and controls the weight percent of solids in the reactor.

Figure 3:
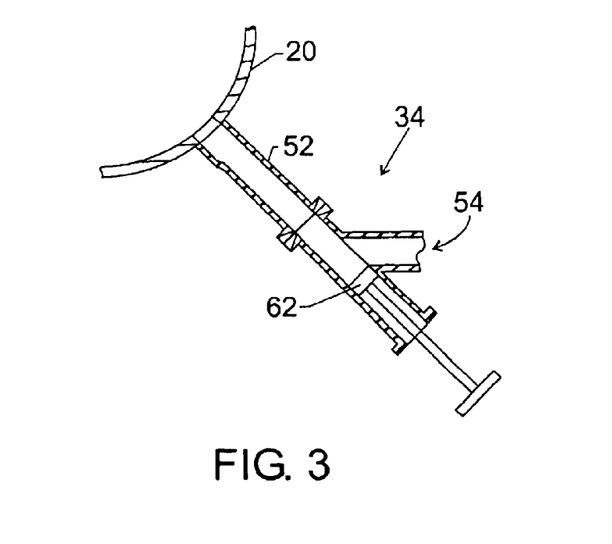
FIG. 3 is a cross section along line 3—3 of FIG. 2 showing a ram valve arrangement in the continuous take off mechanism.

FIG. 3, which is taken along line 3—3 of FIG. 2, shows a smooth curve or elbow 20 associated with the continuous take off 34 in more detail, the elbow 20 thus being an appendage-carrying elbow. As shown, a take off cylinder 52 is attached at a right angle to a tangent to the outer surface of the elbow. A slurry withdrawal line 54 follows take off cylinder 52. Disposed within the take off cylinder 52 is a ram valve 62 which serves two purposes. First it provides a simple and reliable clean-out mechanism for the take off cylinder if it should ever become fouled with polymer. Second, it can serve as a simple and reliable shut-off valve for the entire continuous take off assembly. By closing spare continuous take off mechanisms with a ram valve, plugging is avoided.

Figure 4:
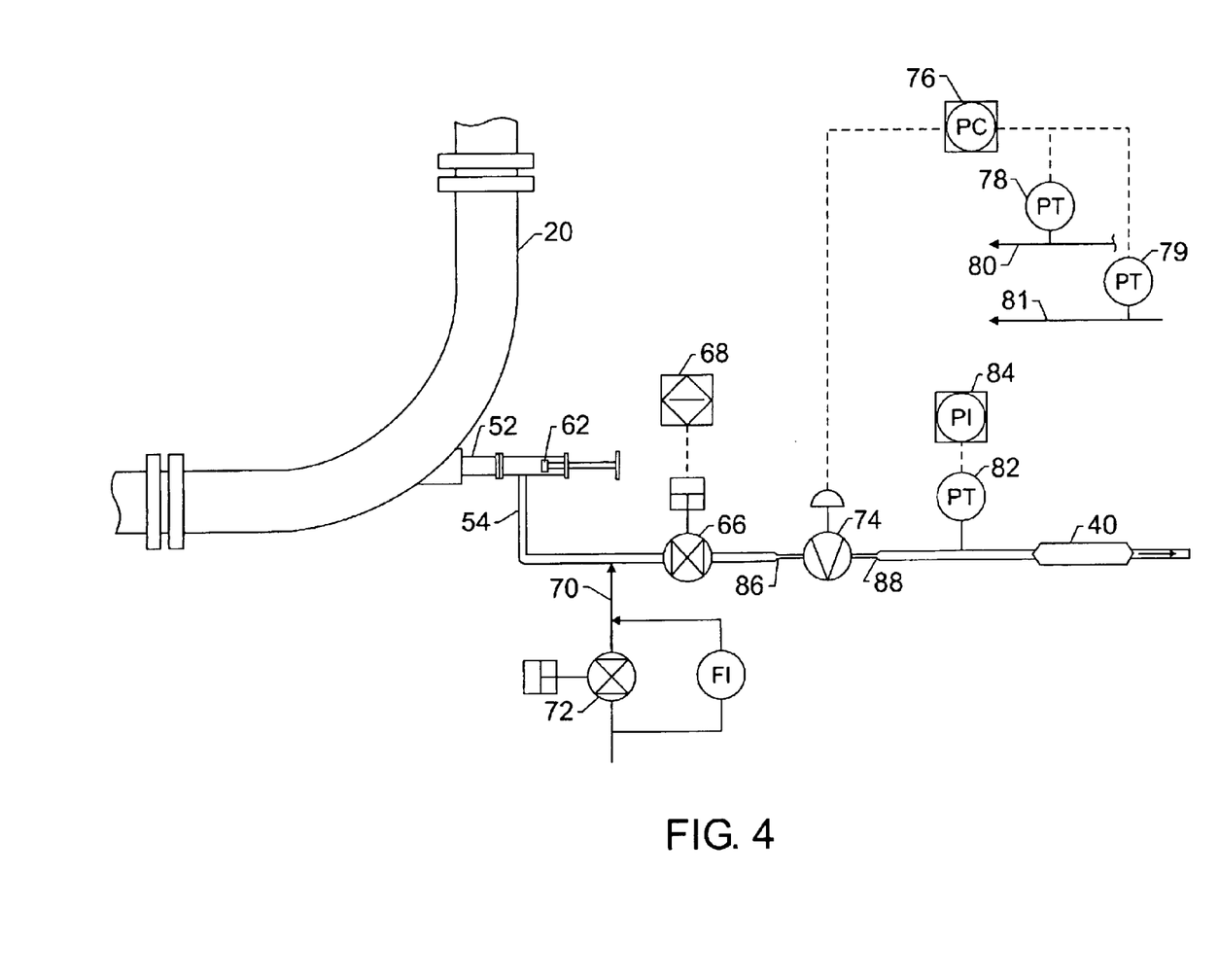
FIG. 4 shows a continuous take off mechanism and control system.

FIG. 4 shows a novel control scheme and system for the continuous take off mechanism. FIG. 4 shows the slurry withdrawal line 54 leading to a block valve 66, which may be actuated by a programmable logic controller 68. Block valve 66 may be controlled remotely as well. Block valve 66 closes automatically under certain situations. For example, if a significant drop in reactor pressure is detected, the logic may cause the block valve 66 to close in case there is a leak downstream in the slurry withdrawal line 54. The block valve 66 may also serve as a back up to the closed ram valve 62 and prevent hydrocarbon leakage. When the block valve 66 is closed, the continuous take off mechanism does not remove slurry from the reactor for downstream recovery.

It has been found desirable to maintain at least one continuous take off mechanism in inactive status by closing block valve 66 (or another downstream valve) rather than ram valve 62. A continuous take off is inactive if it is not being used to withdraw product slurry as part of the normal commercial production of the polyolefin. The flush line 70 and flush valve 72 may also be operated to automatically feed diluent to slurry withdrawal line 54 if a downstream valve or block valve is shut or plugged. By closing block valve 66 or other downstream valve but leaving ram valve 62 open, the continuous take off mechanism can be maintained as a "hot spare" or "hot standby" that may rapidly, essentially instantaneously, remotely, and/or automatically be put into use if needed. By maintaining a "hot spare" continuous take off mechanism, an additional continuous take off mechanism can rapidly (within 1 minute or less) be put into operation during certain situations and prevent high pressure in the reactor. The continuous take off mechanism can be maintained as a hot spare by continually flushing diluent through flush line 70 and flush valve 72 when the block valve 66 is closed. Alternatively, a hot spare may have the block valve open and another downstream valve (for example, the proportional motor valve 58 or the CTO valve 74) closed. In that case, the flush line 70 and flush valve 72 may be locate downstream of block valve 66. The flush line 70 and flush valve 72 may also be operated to automatically feed diluent to slurry withdrawal line 54 if the continuous take off mechanism is shut or plugged. It is highly desirable to equip the loop reactor with at least one continuous take off mechanism to exist as a spare, in case the active continuous take off mechanism become plugged, which is a significant risk during operation.

After the block valve 66, in FIG. 4 the flash line leads to the continuous take off (CTO) valve 74 (which may be a proportional motor valve). The CTO valve 74 may be any valve suitable for a slurry, but a V-ball valve is preferred. Vee-ball® Rotary Control valves are available from Fisher Controls International, Inc. of Marshalltown, Iowa. Details regarding V-Ball valves may be found in U.S. Pat. No. 5,016,857, which is incorporated by reference herein. Preferably, the V-ball valves have a nominal body size larger than 1 inch, such 1½ inch or larger. The CTO valve 74 may be automatically or manually controlled. Preferably, the CTO valve is controlled so that it is opened between 20% and 85%, alternatively 20% to 70%, of its output capacity. Operating at lower output capacities tends to result in plugging and operating at higher output capacities tends to impede the flashing of diluent by the flash line heaters. In FIG. 4, the CTO valve 74 is shown on a horizontal fluid line, but it has been found the CTO valve may also be disposed on a vertical line without plugging.

In FIG. 4, an automatic control is shown in the form of a programmable controller 76, which adjusts the CTO valve 74 in response to one or more input signals. The input signals in FIG. 4 are from pressure transmitters 78 and 79 on feed lines 80 and 81 to the loop reactor. However, the input signal may be indicative of the pressure (or other parameter) in the reactor or in downstream equipment, such as the flash line or a flash chamber.

A pressure transmitter 82 may be located downstream of the CTO valve 74. The pressure transmitter 82 may be employed to detect plugging of the CTO valve 74 (by detecting decreased pressure or flow or abnormal valve opening for a given flow) and signal a pressure indicator 84 of the potential plugging. Preferably, the pressure indicator is a diaphragm type pressure indicator.

Figure 5:
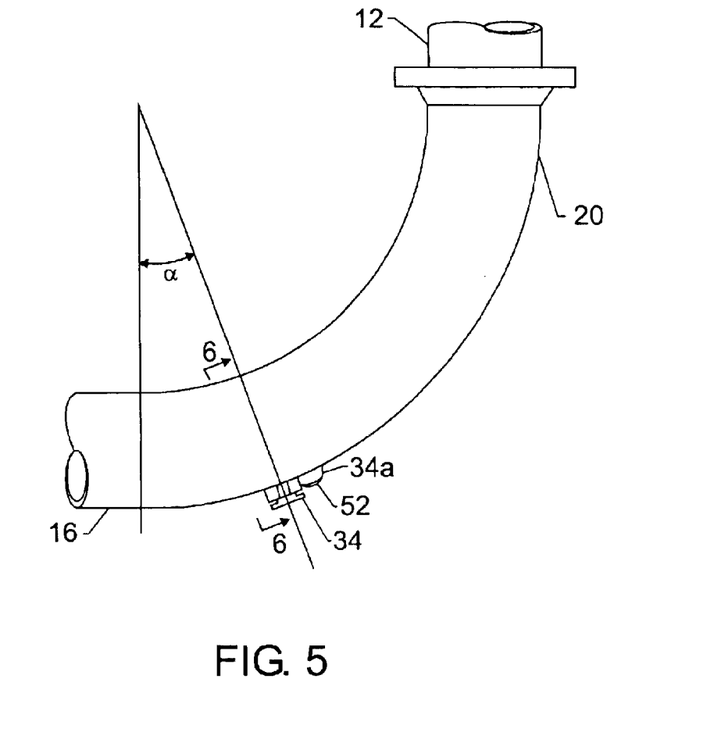
FIG. 5 is a side view of an elbow of the loop reactor showing a continuous take off mechanism.

FIG. 5 shows an angled orientation of the take off cylinder 52. The take off cylinder is shown at an angle, alpha, to a plane that is (1) perpendicular to the centerline of the horizontal segment 16 and (2) located at the downstream end of the horizontal segment 16. The angle with this plane is taken in the downstream direction from the plane. The apex for the angle is the center point of the elbow radius as shown in FIG. 5. The plane can be described as the horizontal segment cross sectional plane. Here the angle depicted is about 24 degrees. Second, it shows a plurality of continuous take off appendages, 34 and 34a. Third, it shows one appendage, 34 oriented on a vertical center line plane of lower segment 16, and the other, 34a, located at an angle to such a plane as will be shown in more detail in FIG. 6.

The continuous take off cylinders are smaller than the conventional settling legs. Yet three 2-inch ID continuous take off appendages can remove as much product slurry as 14 eight-inch ID settling legs. This is significant because with commercial loop reactors of 15,000–18,000 gallon capacity, 6 eight-inch settling legs are required. It is not desirable to increase the size of the settling legs because of the difficulty of making reliable valves for larger diameters. Reactors of 30,000 gallons or more benefit from the present process and apparatus. Generally the continuous take off cylinders will have a nominal internal diameter within the range of from about 1 inch to about 8 inches. Preferably they will be from about 2 to about 3 inches internal diameter. As the line extends from the reactor, the diameter may gradually increase or decrease to provide the desired effect on pressure and/or flow within the line. The line may gradually reduce in diameter leading to the CTO valve (and gradually increase in diameter after passing the CTO valve) in order to adapt to the size of the control valve, maintain a high slurry velocity and/or not provide sharp edges that can lead to polymer buildup. For example, a 2 inch line diameter may gradually taper to 1.5 inch diameter over 3 inches before the CTO valve 74, and then reverse-taper from 1.5 inch diameter to 2 inch over a similar distance after the CTO valve 74. In FIG. 4, tapered conduits or swedges 86 and 88 are shown before and after the CTO valve 74. Nonetheless, it is important to ensure there are no sudden enlargements or contractions of the lines' diameters, as that could lead to plugging. Preferably, the housing of the CTO valve is flanged for attachment to hollow appendages through which the withdrawn slurry flows. For the same reason, it is important to ensure smooth connections between pipes and no misalignments between pipe connections.

Figure 6:
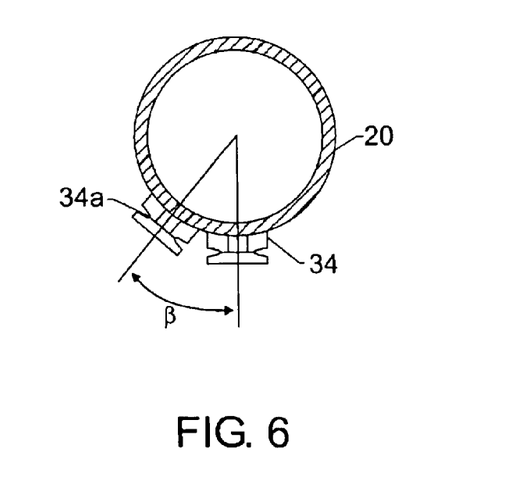
FIG. 6 is a cross section across line 6—6 of FIG. 5 showing the orientation of two of the continuous take off mechanisms.

FIG. 6 is taken along line 6—6 of FIG. 5 and shows take off cylinder 34a attached at a place that is oriented at an angle, beta, to a vertical plane containing the center line of the reactor. This plane can be referred to as the vertical center plane of the reactor. This angle can be taken from either side of the plane or from both sides if it is not zero. The apex of the angle is located at the reactor center line. The angle is contained in a plane perpendicular to the reactor center line as shown in FIG. 6.

It is noted that there are three orientation concepts here. First is the attachment angle (in other words, the angle between the surface of the reactor and the take off cylinder), for example about 30 degrees as in FIG. 2 and about 90 degrees (perpendicular) as in FIG. 3. The attachment angle may be tangential or perpendicular or any angle between 0 and 90 degrees, alternatively from about 20 to about 80 degrees, alternatively from about 30 to about 60 degrees. Second is the curve angle, that is, the orientation relative to how far up the curve of the elbow the attachment is, as represented by angle alpha (FIG. 5). The curve angle can be anything from 0 to 90 degrees but is preferably 20 to 70 degrees, alternatively 40 to 60 degrees, alternatively 45 to 70 degrees. Different angles may be selected depending on many factors, including the direction of slurry flow (upward or downward). For example, the curve angle may be 45 degrees. As another example, the curve angle may be 70 degrees. Third is the angle, beta, from the center plane of the longitudinal segment (FIG. 6). This center plane angle can be from 0 to 60 degrees, preferably 0 to 45 degrees, more preferably 0 to 20 degrees, most preferably about 0 degrees.

FIG. 7 is a side view of an elbow of the loop reactor showing the placement of a plurality of continuous take off mechanisms. Four continuous take off mechanisms are shown, though only two are active; the other two continuous take off mechanisms are provided as options or spares. In FIG. 7, the continuous take off 34d and 34e are located at curve angles 30 degrees and 60 degrees on the downward flow leg (that is, the leg through which the fluid slurry is flowing downward), and the continuous take off 34f and 34g at 70 degrees and 40 degrees on the upward flow leg (that is, the leg through which the fluid slurry is flowing upward). In general, ranges of 0–60 degrees on a downward flow leg and a range of 30–90 degrees, more preferably 70–90 degrees, on an upward flow leg are preferred.

Figure 8:
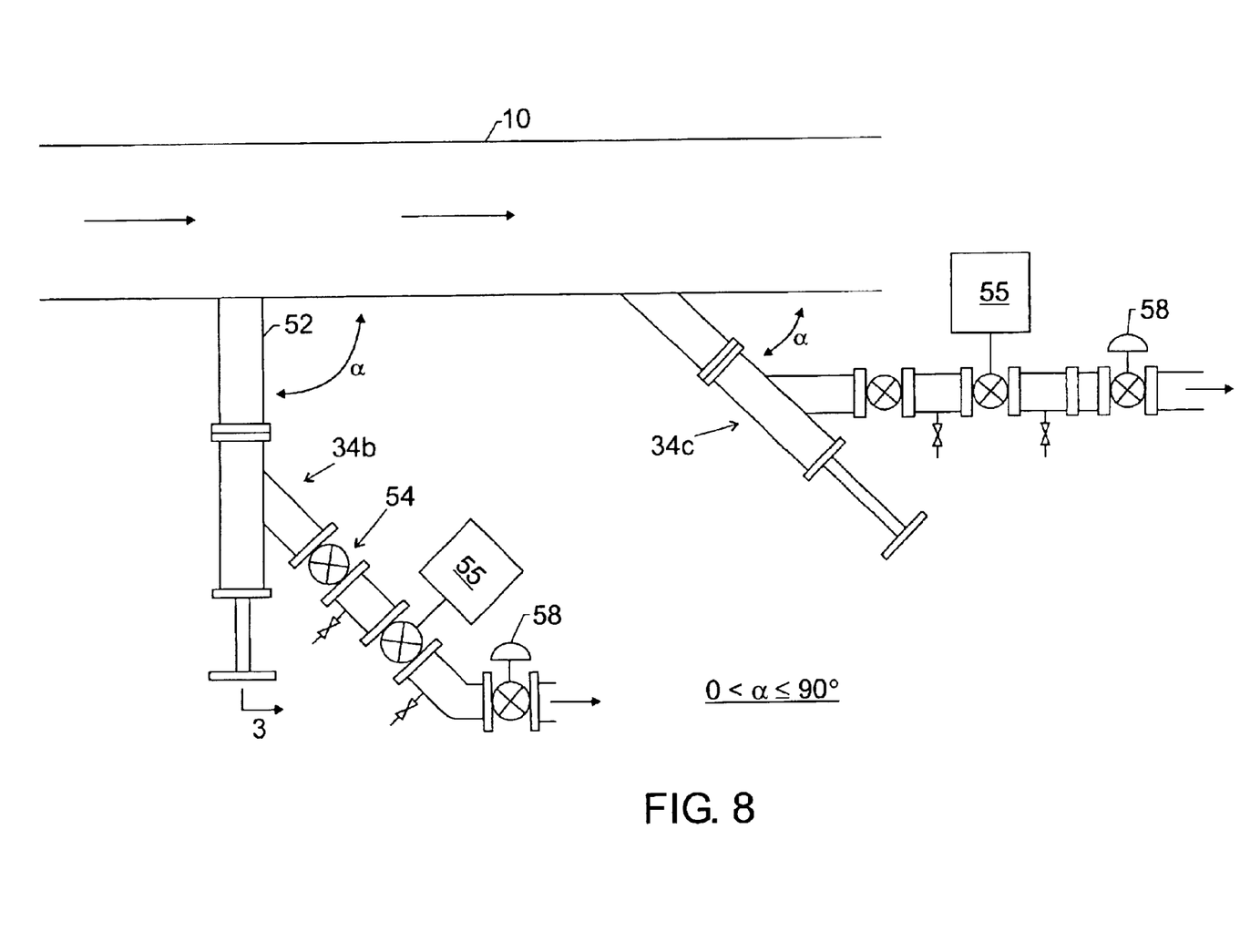
FIG. 8 is a cross section of a portion of a loop reactor and two continuous take off mechanisms.

FIG. 8 shows a cross section of a horizontal segment of a loop reactor and two continuous take off mechanisms 34b and 34c. These continuous take off mechanisms 34b and 34c are disposed along a horizontal segment of the loop reactor 10 and form angle gamma with the bottom edge of the horizontal segment. The angle gamma is greater than 0 degrees and less than or equal to 90 degrees. This arrangement is especially suitable for a horizontal loop reactor which does not have upward or downward flowing elbows. In other words, this arrangement is suitable for the horizontal loop reactor where the major segments and minor segments are all disposed in an essentially horizontal plane. The horizontal segments need not extend along a perfectly horizontal axis but rather may be substantially horizontal. For example, a horizontal segment may be positioned at a tilt or angle that is between 0 and 15 degrees from a true horizontal plane.

With larger reactor volumes and higher solids concentrations, one must continue to ensure that the continuous take off valve does not become plugged. Higher solids concentrations increase the chance of larger polymer particles or agglomerates in the fluid slurry and therefore increase the risk of continuous take off valve plugging. Larger reaction volumes increase the economic loss due to production loss as a result of valve plugging.

It has been discovered that automatic and/or regular movement of the continuous take off valve is useful for reducing or avoiding instances of plugging in the valve. Regular movement of the continuous take off valve may attain a reduction in instances of continuous take off valve plugging. The short localized pressure pulse created by the movement of the continuous take off valve can reduce plugging by forcing accumulated polymer chunks or particles through the valve. However, the duration and magnitude of the pressure pulse is not so large as to significantly affect the average pressure of the loop reactor. By moving the continuous take off valve at regular intervals, regardless of the detection of plugging, the operator can clear the continuous take off valve, ensure regular production of polymer and avoid plugging problems before they occur.

As another alternative of the present process and apparatus, the continuous take off valve is adjusted in response to the reactor pressure. The adjustment may be accomplished by actuating the continuous take off valve with a controller according to a particular signal, which may be a signal from a pressure measuring device. With such a system, larger particles or agglomerates can pass through the valve when the valve is more open while reactor pressure control and less flow is maintained when the valve is less open. The regular movement ensures that the valve will experience maximum throughput on a regular basis, thereby providing regular opportunities to pass larger particles or agglomerates of polymer as in the close/open control figuration previously described.

While the invention has been described with reference to certain figures, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

That which is claimed is:

1. A polymerization process comprising:
    feeding a feed material comprising at least one olefin monomer to a loop reaction zone;
    polymerizing, in the loop reaction zone, the olefin monomer to produce a fluid slurry comprising solid olefin polymer particles;
    continuously withdrawing a portion of the fluid slurry through a plurality of active slurry withdrawal lines;
    monitoring the pressure in the active slurry withdrawal lines; and
    opening an inactive slurry withdrawal line in response to the monitored pressure in one of the active slurry withdrawal lines.

2. A process according to claim 1, further comprising flushing diluent through the inactive slurry withdrawal line prior to opening.

3. A process according to claim 2, further comprising automatically activating the inactive slurry withdrawal line when one of the active slurry withdrawal lines is at least partially plugged.

4. A process according to claim 3, further comprising:
    rendering the inactive slurry withdrawal line active within 1 minute of detecting the plugging.

5. A process according to claim 1 wherein the active and inactive slurry withdrawal lines are the exclusive means for withdrawing product slurry from the loop reaction zone.

6. A process for operating a loop polymerization reactor, the process comprising:
    feeding at least one olefin monomer and diluent to the reactor;
    feeding a polymerization catalyst to the reactor;
    circulating a fluid slurry comprising unreacted ethylene and solid polyethylene particles in the diluent through the reactor;
    continuously withdrawing a portion of the fluid slurry through a plurality of active continuous take off; and
    continuously flushing diluent through an inactive continuous take off.

7. A process according to claim 6 further comprising activating the inactive continuous take off when at least one of the active continuous take offs is at least partially plugged.

8. A process according to claim 7 further comprising:
    activating the inactive continuous take off within 1 minute of detecting the plugging.

9. A process according to claim 6 wherein the active and inactive continuous take offs are the only take off for product slurry from the loop reaction zone.

10. A process for starting a loop polymerization reactor, the process comprising:
    feeding ethylene to the reactor; and
    feeding isobutane to the reactor;
    wherein the mass ratio of ethylene to isobutane fed to the reactor is sufficiently low to avoid plugging of a continuous take off.

11. A process according to claim 10 wherein the mass ratio is 1:1 or lower.

12. A process according to claim 10 wherein the mass ratio is 4:5 or lower.

13. A process according to claim 10 wherein the mass ratio is 2:3 or lower.

* * * * *